United States Patent [19]

Tribe

[11] 4,063,785
[45] Dec. 20, 1977

[54] FAIL SAFE BYPASS FOR A SKID CONTROL SYSTEM
[75] Inventor: Leonard T. Tribe, Ann Arbor, Mich.
[73] Assignee: Kelsey-Hayes Company, Romulus, Mich.
[21] Appl. No.: 633,110
[22] Filed: Nov. 18, 1975
[51] Int. Cl.² ............................................. B60T 8/10
[52] U.S. Cl. .................................. 303/115; 137/599.2
[58] Field of Search ................ 303/21 AF, 21 F, 115; 137/599.2

[56] References Cited
U.S. PATENT DOCUMENTS

| | | | |
|---|---|---|---|
| 3,309,852 | 3/1967 | Allen | 137/596.2 |
| 3,414,336 | 12/1968 | Atken et al. | 303/21 F |
| 3,524,685 | 8/1970 | Harned et al. | 303/21 F |
| 3,602,554 | 8/1971 | Ichimura et al. | 303/21 AF |
| 3,610,701 | 10/1971 | Riordan | 303/21 AF |
| 3,672,731 | 6/1972 | Koivunen | 303/21 F |
| 3,684,328 | 8/1972 | Koivunen | 303/21 AF |
| 3,782,786 | 1/1974 | Matsumura | 303/21 F |

Primary Examiner—George E. A. Halvosa
Assistant Examiner—Edward R. Kazenske
Attorney, Agent, or Firm—Harness, Dickey & Pierce

[57] ABSTRACT

Two embodiments of skid control systems for preventing the skidding of a wheel of a vehicle, each having a fluid pressure actuated brake and a hydraulic modulator that is operated by a vacuum motor in response to a predetermined skid signal to reduce the pressure on the wheel brake to prevent skidding. A bypass valve is incorporated for providing a direct source of actuating fluid to the wheel brake in the event of failure of the vacuum actuator to maintain the modulator in a normal braking position due to failure of the vacuum actuator. In each embodiment the hydraulic modulator includes a skid control valve movable between an open, normal braking position and a closed, skid control position in response to the predetermined skid signal. In one embodiment of the invention, the skid control valve is supported within the structure of the bypass valve to provide a compact assembly.

1 Claim, 3 Drawing Figures

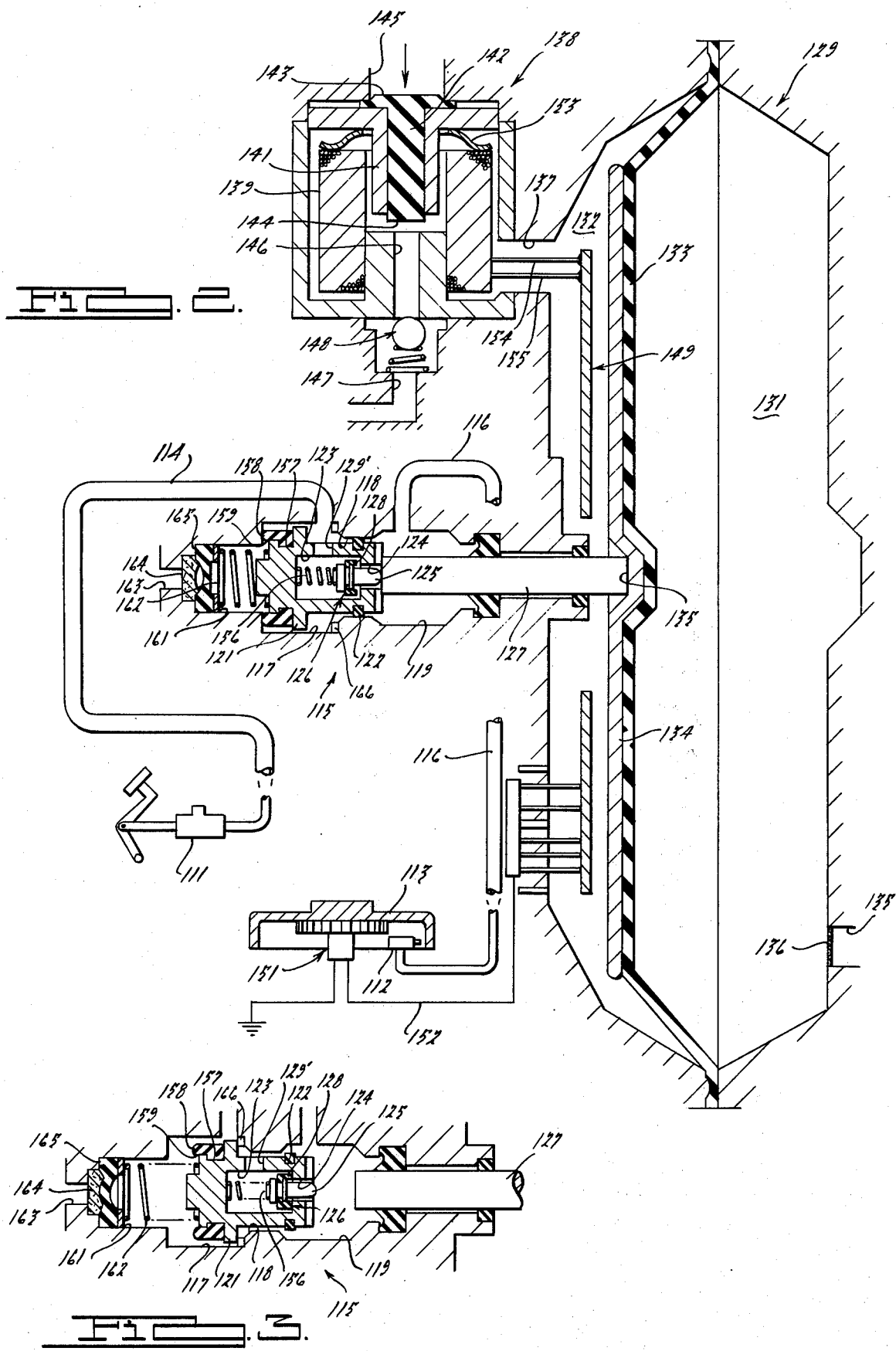

FAIL SAFE BYPASS FOR A SKID CONTROL SYSTEM

BACKGROUND OF THE INVENTION

This invention relates to a skid control system and more particularly to an improved fail safe bypass for such a system.

Most skid control systems embody a modulator that is operable upon receipt of a predetermined signal for reducing the effect of the actuating source on a wheel brake to prevent skidding under predetermined conditions. The modulators normally include an element that is moved between a normal braking position and a skid control position in response to a predetermined signal. One common actuator employed for operating such elements between its positions is a vacuum motor. Such motors normally hold the element in its normal braking position by the exertion of vacuum on one side of the power element of the vacuum actuator. This means that, in the event of failure of the vacuum circuit, the skid control modulator may move to a skid control position at an unnecessary or undesired time. This can result in the loss of braking ability.

Various types of devices have been proposed for use in combination with such vacuum actuated skid control systems for fail safe operation. Because the vacuum motor is used to move the element of the modulator between its positions during skid control operation, the fail safe device should not sense such operation as a failure and disable the modulator. Normally failures have been sensed by measuring the time interval when the power element of the vacuum actuator is in its skid control position. An excessive time duration in this position is sensed as failure and the fail safe mode is initiated. Such devices have many disadvantages. Particularly, the devices are slow to operate in that they do not immediately sense failure of the system.

It is, therefore, a principal object of the invention to provide an improved fail safe device for a vacuum actuated skid control modulator.

It is another object of the invention to provide a fail safe device that is directly responsive to failure of the skid control modulator.

It is a further object of the invention to provide an improved failure sensitive bypass system for a vacuum actuated skid control system.

As has been previously noted, it is important to provide a fail safe device in a skid control brake system for insuring normal brake operation in the event of failure of the skid control modulator and particularly failure of the actuating element for the modulator. As has also been noted, the actuator element, during normal skid control operation, moves between its normal braking position and its skid control position. Most of the previously proposed fail safe devices sense such movement as a failure in the system. It has, therefore, been necessary to provide a timing circuit or a disabling circuit for preventing operation of the fail safe device during normal skid control operation of the modulator. Such arrangements not only complicate the system but also give rise to the addition of other sources of failures.

It is, therefore, a further object of the invention to provide an improved fail safe device for a skid control system which senses normal skid control operation and does not disable the modulator during such normal operation.

In the skid control brake systems as previously described the modulator includes a skid control valve that is movable between an open, normal braking position and a closed, skid control position. In this latter position, the communication between the actuator controlled source and the wheel brake is prevented. It is desirable to provide a bypass circuit for permitting fluid communication between the source and the wheel brake in the event of failure of the skid control valve to be maintained in its normal braking position. The bypass valves previously proposed have been separate elements that add to the complexity and cost of the modulator assembly.

It is, therefore, a further object of the invention to provide an improved and simplified fail safe bypass valve for a skid control system.

It is yet another object of the invention to provide a fluid operated skid control system in which the skid control valve and bypass valve employ common elements to permit simplification and cost reduction.

SUMMARY OF THE INVENTION

A first feature of this invention is adapted to be embodied in a skid control device for preventing the skidding of a wheel of a vehicle having an operator controlled brake actuator adapted to selectively provide a means for operating a wheel brake and a wheel brake controlled by such actuator. Skid control means responsive to an incipient skid condition are provided for modifying the effect of the brake actuator upon the wheel brake to prevent skidding of the wheel associated therewith. The skid control means includes a vacuum motor operable selectively to control the movement of an element between a normal braking position and a skid control position. Means are provided that are responsive to the failure of the vacuum motor to retain the element in a normal braking position for providing the operation of the wheel brake by the brake actuator without modification by the skid control means in the event of such failure.

Another feature of the invention is adapted to be embodied in a skid control device for preventing the skidding of a wheel of a vehicle having a fluid pressure actuating wheel brake and a source of actuating fluid pressure for the brake. The skid control device includes modulator means operationally interposed between the source and the wheel brake for operation between a normal braking position and a skid control position for reducing the fluid pressure applied to the wheel brake by the source to prevent skidding of the associated wheel. Power means are operatively connected to the modulator means and include an element movable between a first position and a second position for moving the modulator means between its normal braking position and its skid control position. Bypass means are incorporated to provide a path of actuating fluid from the source to the wheel brake independently of the modulator means. The bypass means is movable from an open position to a normal position and is operatively associated with the power operated means element for holding the bypass means in its closed position when the element is in its first position. The bypass means includes means responsive to the pressure at the source for holding the bypass means in its closed position when the power operated means element moves to its second position under normal skid control operation for preventing operation of the bypass means under such normal skid control operation.

Another feature of this invention is adapted to be embodied in a skid control system for preventing the skidding of a wheel of a vehicle. The vehicle has a fluid pressure actuated wheel brake, an operator controlled source of fluid pressure for actuating the wheel brake and conduit means providing fluid communication between the source and the wheel brake. Skid control valve means are interposed in the conduit and are movable between a normal braking position in which substantially unrestricted communication is provided between the source and the wheel brake and a skid control position in which a restriction is provided to the communication between the source and the wheel brake. Actuating means responsive to an incipient skid condition are provided for moving the skid control valve means between its normal braking position and its skid control position. A fail safe means is also incorporated for providing a substantially unrestricted path of fluid between the source and the wheel brake in response to a failure of the actuating means to retain the skid control valve means in its normal braking position. The fail safe means comprises a bypass valve element interposed in the conduit means and a cooperating bypass valve seat. The bypass valve element is movable relative to the bypass valve seat between a normal closed position in which communication is precluded therethrough and an open position for providing the flow. Means are provided for moving the bypass valve element between its normal closed position and its bypassed position in response to a failure of the actuating means to maintain the skid control valve means in its normal braking position. The bypass valve element defines a fluid path therethrough and a skid control valve seat in said path. The skid control valve element cooperates with said skid control valve seat for controlling the flow through said path.

BRIEF DESCRIPTION OF THE DRAWINGS

FIG. 2 is a partially schematic view of a second embodiment of a skid control system embodying this invention, showing the modulator in cross section.

FIG. 3 is a cross-sectional view of a portion of the modulator of the embodiment of FIG. 2, showing the modulator in its fail safe mode.

DETAILED DESCRIPTION OF THE PREFERRED EMBODIMENTS

EMBODIMENT OF FIG. 1

Figure 1:
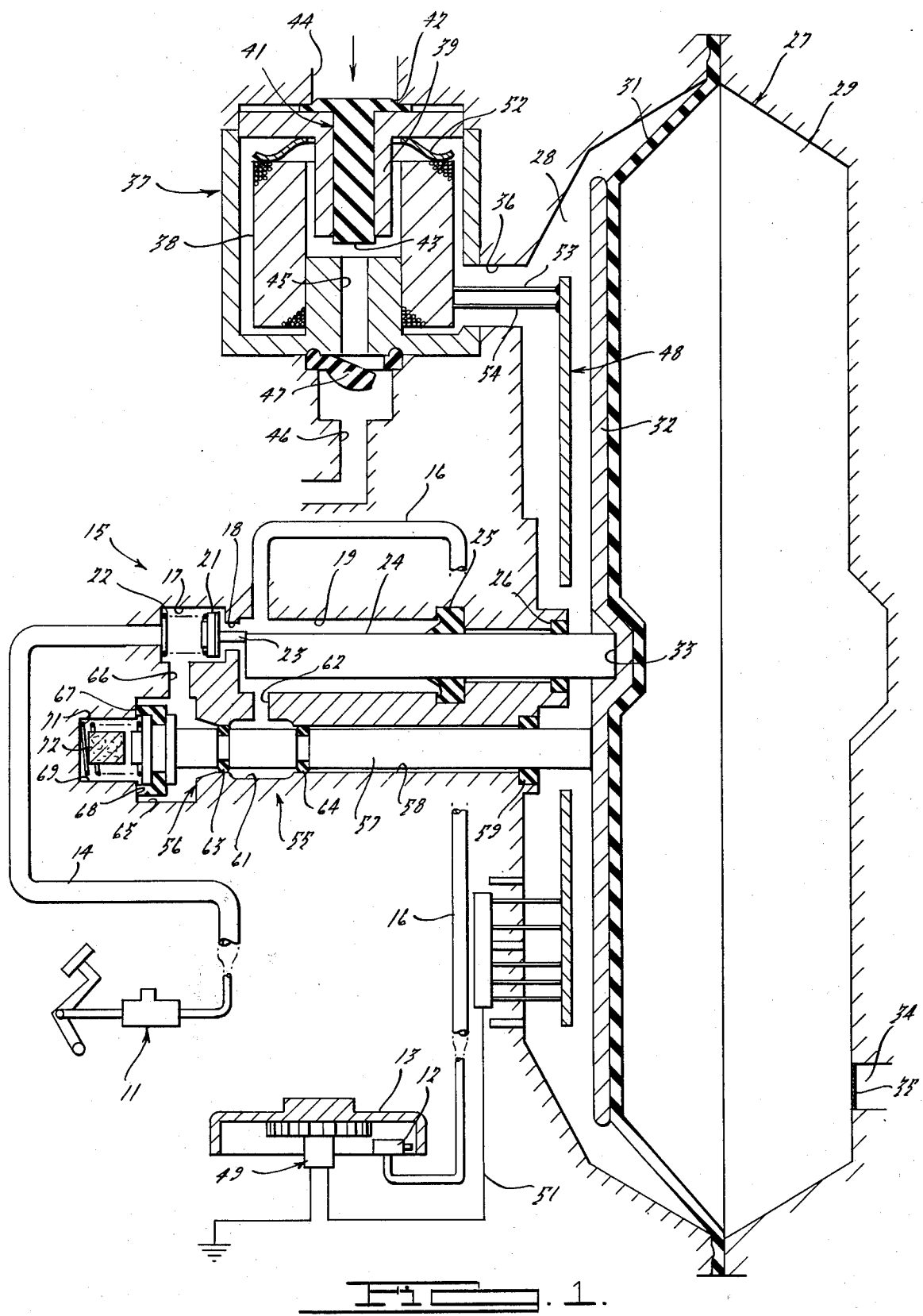
FIG. 1 is a partially schematic view of a first embodiment of a skid control system embodying this invention, showing the modulator in cross section.

FIG. 1 of the drawings illustrates, in part schematically, a skid control system particularly adapted for use with wheeled vehicles. Only so much of the system as is necessary to illustrate an embodiment of the invention has been depicted in this Figure and will be described. The system is illustrated in conjunction with a hydraulically actuated brake including an operator controlled master cylinder 11 and a wheel cylinder 12 that cooperates with a drum 13 that is affixed for rotation with a wheel (not shown) of an associated vehicle. Although only one wheel brake is shown, it is to be understood that the illustrated system may cooperate with additional wheels, preferably those associated with a common axle.

An output conduit 14 from the master cylinder 11 delivers hydraulic fluid to a modulator assembly, indicated generally by the reference numeral 15. An output conduit 16 extends from the modulator 15 to the wheel cylinder 12. The conduit 14 terminates at an enlarged bore 17 formed in the modulator 15. A passage 18 extends from the bore 17 to an expansion piston chamber 19. The conduit 16 originates at the expansion piston chamber 19.

A check valve 21 is positioned in the bore 17 for controlling the flow through the passage 18. The check valve is illustrated in an opened position in the drawing and a biasing spring 22 urges the check valve 21 toward a closed position in which communication between the passage 18 and bore 17 is precluded. The check valve 21 is formed with an extension 23 that normally contacts an expansion chamber piston 24 that is slidably supported by means including a pair of seals 25 and 26. As will become apparent, the expansion chamber piston 24 serves the combined function of controlling the position of the check valve 21 and relieving the pressure in the wheel cylinder 12.

The position of the expansion chamber piston 24 is controlled by a vacuum motor, indicated generally by the reference numeral 27. The vacuum motor 27 consists of an enlarged cavity that is divided into two chambers 28 and 29 by a diaphragm 31. A piston 32 is affixed to the diaphragm 31 and is formed with a pocket 33 in which one end of the expansion chamber piston 24 is received. The chamber 29 is exposed to atmospheric pressure by means of a port 34 in which a suitable filter 35 is positioned.

A conduit 36 connects the chamber 28 to a solenoid operated valve, indicated generally by the reference numeral 37. The solenoid valve 37 includes a winding 38 and a slidably supported armature 39. An elastomeric seal 41 extends through the armature 39 and forms valve member portions 42 and 43 at its opposite ends. The valve portion 42 cooperates with an atmospheric port 44 that experiences atmospheric pressure. The valve portion 43 cooperates with a vacuum port 45 that receives a vacuum signal from a vacuum conduit 46, which vacuum may be supplied by the induction system of the engine (not shown) of the associated vehicle. A check valve 47 controls the communication between the conduit 46 and the port 45.

The operation of the solenoid valve 37 is controlled by an electronic module of any known type, which is schematically illustrated at 48 and which may be positioned in the chamber 28. The module 48 has suitable electrical connections which receive a signal from a wheel speed sensing device, indicated generally at 49 via a conductor 51.

FIG. 1 illustrates the skid control system in its normal braking mode. In this mode, the solenoid valve armature 39 is urged to the position shown in FIG. 1 by means of a wave washer spring 52 so as to close the atmospheric port 44 and open the vacuum port 45. Thus, a vacuum signal is exerted from the conduit 46 through the port 45 to the conduit 36. The pressure in the chamber 28 is, therefore, reduced and atmospheric pressure acting on the diaphragm 31 will cause the diaphragm and diaphragm piston 32 to be urged to the left. The expansion chamber piston 24 and check valve 21 are thus maintained in the normal braking position.

To apply the brakes, pressure is generated from the master cylinder 11 through the conduit 14. This pressure and the fluid displaced thereby flows through the bore 17 past the open check valve 21 through the passage 18. The fluid may enter the expansion piston chamber 19 and flow through the conduit 16 to the wheel cylinder 12 to apply the brakes.

In the event the signal processed by the module 48 from the wheel speed sensor 49 indicates an incipient skid condition, the solenoid winding 38 will be energized through conductors 53 and 54 interconnecting the module 48 with the winding 38. The armature 39 will, therefore, be drawn downwardly against the action of the wave washer spring 52 to close the vacuum port 45 by means of the valve portion 43 and open the atmospheric port 44. Therefore, the chamber 28 will now experience atmospheric pressure and permit the diaphragm 31 and diaphragm piston 32 to move to the right. When this occurs, the expansion chamber piston 24 will also move to the right and the check valve 21 will close under the action of the spring 22. Closure of the check valve 21 isolates the master cylinder pressure from the conduit 16. The pressure in the wheel cylinder 12 then may act upon the expansion chamber piston 24 to cause it to move to the right and increase the volume in the expansion chamber 19. The fluid pressure in the wheel cylinder is, thereby, relieved to effect partial or complete release of the brakes.

When the signal processed by the module 48 indicates that the skid condition has been relieved, the winding 38 will be deenergized so that the armature 39 moves again to the position shown in FIG. 1. When this occurs, the diaphragm 31 will again be urged to the left and the diaphragm piston 32 will cause the expansion chamber piston 24 to move into the expansion chamber 19. The displaced fluid exerts a pressure on the wheel cylinder 12 to cause reapplication of the brakes. Assuming no further skid condition is sensed, the expansion chamber piston 24 will reopen the check valve 21 and permit communication between the master cylinder 11 and the wheel cylinder 12 through the path previously described.

From the aforedescribed operation it should be readily apparent that any leakage in the vacuum circuit which will cause the chamber 28 to approach atmospheric pressure will cause the diaphragm 31 and diaphragm piston 32 to move to a skid control position. Unless otherwise compensated for, this movement will cause the expansion chamber piston 24 to move to the right and cause closure of the check valve 21 and a reduction in pressure in the wheel cylinder 12. Unless a fail safe system is provided, such leakage will result in the loss of normal brake operation. To prevent this, a fail safe device, indicated generally by the reference numeral 55 is provided.

The fail safe device 55 includes a bypass valve, indicated generally by the reference numeral 56 and which includes a bypass valve plunger 57. The plunger 57 is slidably supported in a bore 58 that parallels the expansion chamber 19. A portion of the bypass valve plunger 57 extends through a seal 59 and normally engages the diaphragm piston 32. At the termination of the bore 58, an enlarged counterbore 61 is formed. A bypass passage 62 extends from the counterbore 61 into the expansion chamber 19. A pair of annular seals 63 and 64 carried by the bypass valve plunger 57 normally isolates the counterbore 61.

To the left of the counterbore 61 a bypass valve chamber of enlarged diameter 65 is formed. The bypass valve chamber 65 is in communication with the bore 17 via a passage 66.

A latch seal 67 is carried by the bypass valve plunger 57 and normally engages a shoulder 68 formed with the left hand portion of the bypass valve chamber 65. A reduced diameter bore 69 extends from the shoulder 68 and contains a coil spring 71 that acts against the bypass valve plunger 57 and urges it toward the right. A compressible pellet 72 is supported within the spring 71 and acts to maintain a pressure in the bore 69 that is substantially atmospheric during the normal braking mode.

The operation of the device during normal braking and normal skid control operation, except for that of the fail safe bypass 55 has already been described. This description will not be repeated and only the operation of the fail safe bypass device 55 will be described in detail at this point.

During normal braking operation when master cylinder pressure is exerted in the bore 17, this same pressure will be transmitted through the passage 66 to the fail safe bypass chamber 65. The contact of the diaphragm piston 32 with the bypass valve plunger 57 will hold the bypass valve in the position shown in FIG. 1. In the event an incipient skid is sensed and the diaphragm 31 is actuated to the skid control position, the diaphragm piston 32 will no longer serve to hold the bypass valve 56 in its closed position. However, the master cylinder pressure which is trapped in the counterbore 17 will also be experienced in the bypass valve chamber 65. This pressure acts on the latch seal 67 and is sufficient to hold the bypass valve 56 in its closed position. Therefore, during normal braking and normal skid control operation the bypass valve 56 will not interfere with normal operation of the skid control system.

In the event there is a failure in the vacuum source supplied the chamber 28, the diaphragm 31 and diaphragm piston 32 will move to the right, being urged by the spring 71 and plunger 57. When this occurs, the spring 71 will act upon the bypass valve plunger 57 and urge it to the right. It should be noted that at this time there is no master cylinder pressure present in the bypass valve chamber 65. The spring 72 therefore is free to urge the bypass valve plunger 57 sufficiently to the right so that the seal 63 will move into the counterbore 61. Therefore, communication is now permitted between the bypass valve chamber 65 and the counterbore 61 through the open bypass valve formed by the seal 63.

When the brakes are applied under this condition, master cylinder pressure will again be experienced in the chamber 17. The check valve 21 will, however, have been closed by the action of the spring 22 since the expansion chamber piston 24 is no longer held in a position to maintain the check valve 21 in its opened, normal braking position. The master cylinder pressure is transmitted through the passage 66 to the bypass valve chamber 65 and past the open seal 63 into the counterbore 61. This pressure is then exerted through the passage 62 and expansion chamber 19 to the conduit 16 to permit normal brake operation. The master cylinder pressure acting in the bypass valve chamber 65 will not affect the position of the counterbore 57 under this condition since master cylinder pressure will be exerted on both sides of the latch seal 67.

EMBODIMENT OF FIGS. 2 AND 3

The embodiment of FIGS. 2 and 3 is similar in operation and in general construction to the previously described embodiment. In this embodiment, however, the skid control check valve and bypass valve share a common element to simplify the overall construction and reduce its cost, as will become apparent as this embodiment is described.

The system includes an operator controlled master cylinder 111 and wheel cylinder 112 that cooperates with a drum 113 that is affixed for rotation with a wheel (not shown) of an associated vehicle. As with the previously described embodiment, even though one wheel is shown it is to be understood that the system may cooperate with additional wheels, preferably those associated with a common axle.

An outlet conduit 114 extends from the master cylinder 111 to deliver hydraulic fluid to a modulator assembly, indicated generally by the reference numeral 115. An outlet conduit 116 extends from the modulator 115 to the wheel cylinder 112.

The conduit 114 terminates in an enlarged bore 117 formed in the body of the modulator 115. A reduced diameter portion 118, which also serves as a bypass valve seat, extends from the bore 117 to an expansion piston chamber 119. The conduit 116 originates from the expansion piston chamber 119.

In this embodiment of the invention, a bypass valve element 121 is slidably supported in the bore 117 and has a portion which extends through the bypass valve seat 118. The bypass valve element 121 carries a seal 122 that normally engages the bypass valve seat 118 to prevent fluid communication between the bore 117 and the expansion piston chamber 119.

The bypass valve element 121 has an internal bore 123 which terminates at a reduced diameter portion 124. The stem 125 of a skid control check valve, indicated generally by the reference numeral 126, extends through the reduced diameter portion 124 and engages an expansion chamber piston 127. In the illustrated condition, which is the normal braking condition, a sealing member 128 of the check valve 126 is held away from a shoulder surrounding the reduced diameter portion 124 to permit communication between the bore 123 and the expansion piston chamber 119. Brake fluid under pressure may communicate through this passage from the bore 117 by means of a transverse passage 129' formed in the bypass valve element 121.

The position of the expansion chamber piston 127 is controlled by a vacuum motor, indicated generally by the reference numeral 129. The vacuum motor 129 consists of an enlarged cavity that is divided into two chambers 131 and 132 by a diaphragm 133. A piston 134 is affixed to the diaphragm 133 and is formed with a pocket 135 in which one end of the expansion chamber piston 127 is received. The chamber 131 is exposed to atmospheric pressure by means of a port 135 in which a suitable filter 136 is positioned.

A conduit 137 connects the chamber 132 to a solenoid operated valve, indicated generally by the reference numeral 138. The solenoid valve 138 includes a winding 139 and a slidably supported armature 141. An elastomeric seal 142 extends through the armature 141 and forms valve member portions 143 and 144 at its opposite ends.

The valve portion 143 cooperates with an atmospheric port 145 that experiences atmospheric pressure. The valve portion 144 cooperates with a vacuum port 146 that receives a vacuum signal from a vacuum conduit 147, which vacuum may be supplied by the induction system of the engine (not shown) of the associated vehicle. A check valve 148 controls the communication between the conduit 147 and the port 146.

The operation of the solenoid valve 138 is controlled by an electronic module of any known type, which is schematically illustrated at 149 and which may be positioned in the chamber 132. The module 149 has suitable electrical connections which receive a signal from a wheel speed sensing device, indicated generally at 151 via a conductor 152.

FIG. 2 illustrates the skid control system in its normal braking mode. In this mode, the solenoid valve armature 141 is urged to the position shown in FIG. 2 by means of a wave washer spring 153 so as to close the atmospheric port 145 and open the vacuum port 146. Thus, a vacuum signal is exerted from the conduit 147 through the port 146 to the conduit 137. The pressure in the chamber 132 is, therefore, reduced and atmospheric pressure acting on the diaphragm 133 will cause the diaphragm and diaphragm piston 134 to be urged to the left. The expansion chamber piston 127 and check valve 126 are thus maintained in the normal braking position.

To apply the brakes, pressure is generated from the master cylinder 111 through the conduit 114. This pressure and the fluid displaced thereby flows through the bore 117 past the open check valve 126 through the clearance between the valve stem 125 and bore 124. The fluid may enter the expansion piston chamber 119 and flow through the conduit 116 to the wheel cylinder 112 to apply the brakes.

In the event the signal processed by the module 149 from the wheel speed sensor 151 indicates an incipient skid condition, the solenoid winding 139 will be energized through conductors 154 and 155 interconnecting the module 149 with the winding 139. The armature 141 will, therefore, be drawn downwardly against the action of the wave washer 153 to close the vacuum port 146 by means of the valve portion 144 and open the atmospheric port 145. Therefore, the chamber 132 will now experience atmospheric pressure and permit the diaphragm 133 and diaphragm piston 134 to move to the right. When this occurs, the expansion chamber piston 127 will also move to the right and the check valve 126 will close under the action of a spring 156 acting on the valve 126. Closure of the check valve 126 isolates the master cylinder pressure from the conduit 116. The pressure in the wheel cylinder 112 then may act upon the expansion chamber piston 127 to cause it to move to the right and increase the volume in the expansion chamber 119. The fluid pressure in the wheel cylinder 112 is, thereby, relieved to effect partial or complete release of the brakes.

When the signal processed by the module 149 indicates that the skid condition has been relieved, the winding 139 will be deenergized so that the armature 141 moves again to the position shown in FIG. 2. When this occurs, the diaphragm 133 will again be urged to the left and the diaphragm piston 134 will cause the expansion chamber piston 127 to move into the expansion chamber 119. The displaced fluid exerts a pressure on the wheel cylinder 112 to cause reapplication of the brakes. Assuming no further skid condition is sensed, the expansion chamber piston 127 will reopen the check valve 126 and permit communication between the master cylinder 111 and the wheel cylinder 112 through the path previously described.

From the aforedescribed operation it should be readily apparent that any leakage in the vacuum circuit which will cause the chamber 132 to approach atmospheric pressure will cause the diaphragm 133 and diaphragm piston 134 to move to a skid control position. Unless otherwise compensated for, this movement will cause the expansion chamber piston 127 to move to the right and cause closure of the check valve 126 and a reduction in pressure in the wheel cylinder 112. Unless a fail safe system is provided, such leakage will result in the loss of normal brake operation. To prevent this, a fail safe device is provided.

The fail safe device includes certain of the elements already described such as the bypass valve element 121, bypass valve seat 122 and the bypass valve seat formed by the passage 118. The remaining elements of the bypass valve which forms the fail safe device will now be described in detail.

The bypass valve element 126 is formed with a shouldered groove 157 that supports a latch seal 158. The latch seal is normally engaged with a shoulder 159 formed at the base of the bore 117. The shoulder 159 encompasses a bore 161 in which a spring 162 is contained. The spring 162 normally urges the bypass valve element 121 to an opened position, as will be described. The pressure in the bore 161 is maintained at normally atmospheric pressure by means of an atmospheric port 163, filter 164 and seal 165.

FIG. 2 of the drawings illustrates the fail safe device in its normal condition. The diaphragm 133 will, as has been noted, maintain the expansion chamber piston 127 and the check valve 126 in their normal braking positions and abutting element 121 will hold it and seal 158 against shoulder 159.

During skid control cycling, the check valve 126 will be closed and master cylinder pressure will be exerted in the bore 117. This pressure acts upon a differential area of the bypass valve element 121 to hold it in its closed position against the action of the spring 162.

FIG. 3 illustrates the elements in their fail safe mode. In this condition, it may be assumed that an atmospheric pressure leak to the diaphragm chamber 132 will have caused the diaphragm 133 to move to its skid control position. In this condition, the expansion chamber piston 127 will move to the right and permit the check valve 126 to close. At the same time, the spring 162 will act upon the bypass valve element 121 to force it to the right. This movement continues until an enlarged shoulder of this element contacts a plurality of spaced lugs 166 formed around the passage 118. At this point, the bypass valve seal 122 will have moved away from the seat 118 opening up an annular passage between the bypass valve element 121 and the seat 118. The lugs 166 provide a clearance and hydraulic pressure may be experienced from the conduit 114 and bore 117 through this clearance and the annular clearance around the valve seat 118 into the expansion piston chamber 119 and conduit 116. Normal brake application is, therefore, possible during this failure mode.

It should be readily apparent that the described systems provide highly effective fail safe bypasses which are immediately responsive to failure of the vacuum actuator. Furthermore, the bypass systems are held in their closed positions during normal skid control operation by the master cylinder pressure and thus the bypass need not be otherwise disabled during this operation.

It is to be understood that the foregoing description is that of preferred embodiments of the invention. Various changes and modifications may be made without departing from the spirit and scope of the invention as defined by the appended claims.

I claim:

1. In a skid control system for preventing the skidding of a wheel of a vehicle having a fluid pressure actuating wheel brake, an operator controlled source of fluid pressure for actuating said wheel brake, conduit means providing fluid communication between said source and said wheel brake, and modulator means interposed between said source of fluid pressure and said wheel brake for restricting the communication between said source and said wheel brake in response to an incipient skid condition, said modulator means comprising a housing defining a fluid inlet in communication with said source and a fluid outlet in communication with said wheel brake, a passage connecting said fluid inlet with said fluid outlet, said passage having a restricted portion defining a valve seat, a bypass valve element supported within said passage and having a valving portion adapted to cooperate with said valve seat, said bypass valve element being movable in said passage from a normal position in which said valve portion contacts said valve seat and prevents communication of said fluid inlet with said fluid outlet through said passage and a fail safe position in which said valve portion is free of said valve seat and opens communication from said fluid inlet to said fluid outlet through said passage, a fluid inlet port in said bypass valve element, a fluid outlet port in said bypass valve element, passage means extending through said bypass valve element from said fluid inlet port to said fluid outlet port, said fluid inlet port being in fluid communication with said fluid inlet when said bypass valve element is in its normal position, said fluid outlet port being in communication with said fluid outlet, a skid control valve seat defined by said bypass valve element in said bypass valve passage means, a skid control valve supported by said bypass valve element and movable between a skid control position in engagement with said skid control valve seat for preventing fluid communication from said fluid inlet port to said fluid outlet port to a normal position wherein fluid communication is permitted through said fluid inlet port to said fluid outlet port, actuating means engageable when in a normal position with each of said bypass valve element and said skid control valve for holding said valves in their respective normal positions, means for moving said actuating means from its normal position to a skid control position in which said skid control valve is free of engagement with said actuating means and is movable from its normal position to its skid control position, said bypass valve element having an area exposed to the pressure in said passage for holding said bypass valve element in its normal position when fluid pressure is exerted in said passage and said actuating means is in its skid control position and is not engaging said bypass valve element, and spring means acting upon said bypass valve element for moving said bypass valve element from its normal position to its fail safe position for permitting fluid communication from said fluid inlet to said fluid outlet in the event of failure of said actuating means to be retained in its normal position.

* * * * *